(12) United States Patent
Sarashina et al.

(10) Patent No.: US 9,020,342 B2
(45) Date of Patent: Apr. 28, 2015

(54) TRANSMISSION CONTROL APPARATUS IMPROVED IN TRANSMISSION EFFICIENCY OF DOWNSTREAM DATA

(75) Inventors: Masahiro Sarashina, Saitama (JP); Akihiro Takahashi, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 212 days.

(21) Appl. No.: 13/612,463

(22) Filed: Sep. 12, 2012

(65) Prior Publication Data

US 2013/0089325 A1   Apr. 11, 2013

(30) Foreign Application Priority Data

Oct. 6, 2011   (JP) ................................ 2011-222219

(51) Int. Cl.
*H04B 10/40*   (2013.01)
*H04J 14/02*   (2006.01)

(52) U.S. Cl.
CPC ......... *H04J 14/0282* (2013.01); *H04J 14/0246* (2013.01); *H04J 14/0247* (2013.01); *H04J 14/025* (2013.01); *H04J 14/0252* (2013.01)

(58) Field of Classification Search
USPC .............................................. 398/35, 36, 135
See application file for complete search history.

(56) References Cited

U.S. PATENT DOCUMENTS

| 7,616,899 | B2 * | 11/2009 | Nomura et al. | 398/154 |
|---|---|---|---|---|
| 8,406,633 | B1 * | 3/2013 | Johnston et al. | 398/154 |
| 2002/0171895 | A1 * | 11/2002 | Chang | 359/168 |
| 2003/0133460 | A1 * | 7/2003 | Lee et al. | 370/395.43 |
| 2004/0095884 | A1 * | 5/2004 | Lee et al. | 370/235 |
| 2005/0123293 | A1 * | 6/2005 | Maki et al. | 398/12 |
| 2007/0237177 | A1 * | 10/2007 | Endo et al. | 370/468 |
| 2007/0280691 | A1 * | 12/2007 | Bouda | 398/71 |
| 2008/0279549 | A1 * | 11/2008 | Kazawa et al. | 398/17 |
| 2011/0085795 | A1 * | 4/2011 | Ozaki | 398/25 |
| 2011/0091214 | A1 * | 4/2011 | Cheng | 398/91 |
| 2011/0142444 | A1 * | 6/2011 | Borges et al. | 398/25 |
| 2012/0070147 | A1 * | 3/2012 | Mizutani et al. | 398/25 |
| 2013/0045005 | A1 * | 2/2013 | Nakura et al. | 398/25 |

OTHER PUBLICATIONS

Ivan Kaminow, Tingye Li, Optical Fiber Telecommunication IV-B: Systems and Impairments, May 22, 2002, p. 459: 4.4.1.2.*
Hara, et al., "Flexible load balancing technique using dynamic wavelength bandwidth allocation (DWBA) toward 100Gbit/sclass- WDM/TDM-PON", ECOC 2010, Tu.3.B2, Sep. 2010.
Sakaki, et al., "optical access GE-PON system, MileStar", OKI Technical Review 197, vol. 71, No. 1, Jan. 2004.

* cited by examiner

*Primary Examiner* — David Payne
*Assistant Examiner* — Pranesh Barua
(74) *Attorney, Agent, or Firm* — Rabin & Berdo, P.C.

(57) ABSTRACT

In a transmission control apparatus, connected communication devices are detected to find round trip time of transmission to each of the detected communication devices, and the order of each communication device is determined on the basis of the round trip time of transmission to that communication device depending upon the distance thereto. On the basis of the round trip times of transmission to, and the orders of, the communication devices, transmission wait times are determined for delaying transmission of control signals from the communication devices to notify the communication devices of the transmission wait times. When starting communication with the communication devices, timer start signals prompting the communication devices to start counting the transmission wait time are transmitted to the communication devices.

8 Claims, 13 Drawing Sheets

FIG. 3A

| Destination Address | 6 octets |
|---|---|
| Source Address | 6 |
| Length/Type | 2 |
| Opcode | 2 |
| Timestamp | 4 |
| Number of grants | 1 |
| Grant # 1 Start time | 0/4 |
| Grant # 1 Length | 0/2 |
| Grant # 2 Start time | 0/4 |
| Grant # 2 Length | 0/2 |
| Grant # 3 Start time | 0/4 |
| Grant # 3 Length | 0/2 |
| Grant # 4 Start time | 0/4 |
| Grant # 4 Length | 0/2 |
| Pad/Reserved | 15-39 |
| FCS | 4 |

FIG. 3B

| Destination Address | 6 octets |
|---|---|
| Source Address | 6 |
| Length/Type | 2 |
| Opcode | 2 |
| Timestamp | 4 |
| Number of queue sets | 1 |
| Report bitmap | 1 |
| Queue #0 Report | 0/2 |
| ... | |
| Queue #7 Report | 0/2 |
| Report bitmap | 1 |
| Queue #0 Report | 0/2 |
| ... | |
| Queue #7 Report | 0/2 |
| Pad/Reserved | 0-39 |
| FCS | 4 |

| DATA RATE [GHz] | 10 |
|---|---|
| GRANT PERIOD [μs] | 1000 |
| GATE FRAME SIZE [ns] | 51.2 |
| IPG [ns] | 9.6 |

TRANSMISSION CONTROL APPARATUS IMPROVED IN TRANSMISSION EFFICIENCY OF DOWNSTREAM DATA

BACKGROUND OF THE INVENTION

1. Field of the Invention

The present invention relates to a transmission control apparatus, for example, a transmission control apparatus for use in a line terminating unit included in an optical access network.

2. Description of the Background Art

Optical access networks have been constituted at low cost by widely using an Ethernet passive optical network (EPON) system. Gigabit Ethernet PON (GE-PON) systems have been widely popularized in Japan as one of the EPON systems. In these days, when network services of GE-PONs are applied in, for example, collective housing and overcrowded areas, GE-PONs capable of multiple branching are necessary in order to reduce the operational cost.

In conventional GE-PONs, upstream bands for use in transmission from optical network units (ONUs) in the premises of subscribers to an optical line terminal (OLT) in a station, or central office, of a telecommunications carrier may be shared by the ONUs currently involved in communications.

As a bandwidth allocation scheme, dynamic bandwidth allocation (DBA) is used. In the DBA, an OLT grasps a traffic volume raised in each ONU and allocates a communication band corresponding to the traffic volume. This attains economical, efficient bandwidth allocation.

With reference to FIG. 2, notification of a traffic volume from each of the ONUs 92-1 to 92-3 to the OLT 91 uses a Report frame, and notification of an allocation band from the OLT 91 to each of the ONUs 92-1 to 92-3 uses a Gate frame. The Report and Gate frames are, for example, standardized by IEEE (Institute of Electrical and Electronics Engineers) 802.3av/ah. Std, as shown in FIGS. 3A and 3B, respectively.

According to FIG. 2, the ONUs 92-1 and 92-2 notify upstream traffic volumes raised themselves to the OLT 91 on Report frames R. The OLT 91 provides time slots for receiving Report frames to receive Report frames associated with the connected ONUs. Then, the OLT 91 determines bands to be allocated to the ONUs 92-1 and 92-2. Bands are allocated in every predetermined period of time called a grant period. Bands thus determined will be allocation bands for use in the grant period successive thereto. Information on the determined bands is delivered to the ONUs 92-1 and 92-2 on Gate frames G. The ONUs 92-1 and 92-2 read out from the Gate frames transmission time for transmitting a Report frame and upstream data of themselves in the successive grant period, and starts transmitting the appropriate Report frame and the upstream data at the transmission time thus read out.

The upstream transmission proceeds in this way. In FIG. 2, RTT represents a period of time from when the OLT 91 starts transmission of Gate frames toward the ONUs to when the OLT receives first a Report frame in reply from an ONU, that is, Round Trip Time. The technique collecting information on a data storage volume from Report frames transmitted by the ONUs 92-1 and 92-2 to conduct DBA calculation is called status reporting DBA (SR-DBA).

The conventional DBA scheme requires the OLT to collect Report frames for all ONUs in the system. That further requires the OLT to transmit Gate frames to all ONUs.

The grant period consists of a Gate and a Data transmission time interval or subperiod. In Data transmission intervals, the OLT transmits Gate frames separated by a predetermined temporal gap from each other, called inter-packet gap (IPG).

According to the Gate frame format shown in FIG. 3A, the field Grant #1 defines a prompt of transmitting a Report frame by means of the start time of the transmission, "Start Time", and the field Grant #2 defines a prompt of transmitting upstream data by means of the length of period of the transmission, "Length".

The "Start Times" are selected such as to time division-multiplex transmission frames of the ONUs without colliding with each other. The value of "Length" represents the size of Report frame when transmitting a Report frame, and a time duration corresponding to an allocation band when transmitting upstream data. The size of Report frame is fixed as defined by the Report frame format shown in FIG. 3B.

A prompt, or instruction, of transmitting Report frames is directed to all ONUs connected to the OLT. A prompt, or instruction, of transmitting upstream data is directed only to an ONU or ONUs in which upstream traffic is raised.

When a smaller number of ONUs are connected, a small number of Gate frames are transmitted accordingly, so that grant periods are available for transmitting downstream data in the portions thereof proportionate. On an optical network system branching into a lot of optical access networks including a corresponding number of connected ONUs, however, a proportionately increased number of Gate frames may be transmitted. This requires the Grant periods to be occupied by longer Gate transmission times so as to squeeze downstream data transmission times, thereby deteriorating the transmission efficiency of downstream data.

The above problem could be solved by increasing the length of grant periods. However, since the length of grant periods is proportional to delay time in data transmission, this solution would result in an increase in the delay time. Therefore, a transmission control system is required which is improved in efficiency of transmitting downstream data without modifying grant periods.

SUMMARY OF THE INVENTION

It is an object of the present invention to provide a transmission control apparatus improved in efficiency of transmitting downstream data without modifying grant periods.

In accordance with the present invention, a transmission control apparatus responsive to a control signal transmitted to and received from a plurality of communication devices connectable to the apparatus for allocating a time division communication band to control transmission of the plurality of communication devices comprises: a discovery processor detecting the communication devices connected and determining round trip time of transmission to each of the detected communication devices; an order determiner using the round trip time of transmission to each of the communication devices for determining an order of each of the communication devices corresponding to a distance to the communication device to produce ordering information; a transmission wait time calculator using the round trip time of transmission to each of the communication devices and the ordering information for determining transmission wait time in which transmission of the control signal from each of the communication devices is to be delayed; a transmission wait time notifier notifying each of the communication devices of the transmission wait time for the communication device; and a measurement start signal transmitter transmitting, when starting communication with each of the communication devices, a timer count start signal to the communication device, the timer count start signal prompting the communication device to start counting the transmission wait time.

The present invention can improve the transmission efficiency of downstream data without modifying a grant period.

According to the present invention, improvement contributes to improvement on the efficiency of using bands in a line terminating unit in an optical access system in the form of, for example, passive optical network (PON) connecting an optical line terminal (OLT) installed in a central office, or station, of a telecommunications carrier to plural optical network units (ONUs) installed in the premises of subscribers.

BRIEF DESCRIPTION OF THE DRAWINGS

The objects and features of the present invention will become more apparent from consideration of the following detailed description taken in conjunction with the accompanying drawings in which:

FIGS. 3A and 3B show the formats of Report and Gate frames, respectively;

DESCRIPTION OF THE PREFERRED EMBODIMENTS

Well, reference will be made to the accompanying drawings to describe a basic concept in accordance with preferred embodiments of the present invention. The transmission control system in accordance with the preferred embodiments relies upon the basic concept that optical network units (ONUs) installed in the premises of subscribers are notified, in advance, of Report transmission time to thereby decrease the number of Gate frames to be transmitted. This can improve the efficiency of transmitting downstream data even with an optical access network systems branching into many optical access networks over which an increased number of Gate frames are transmitted.

Figure 1:
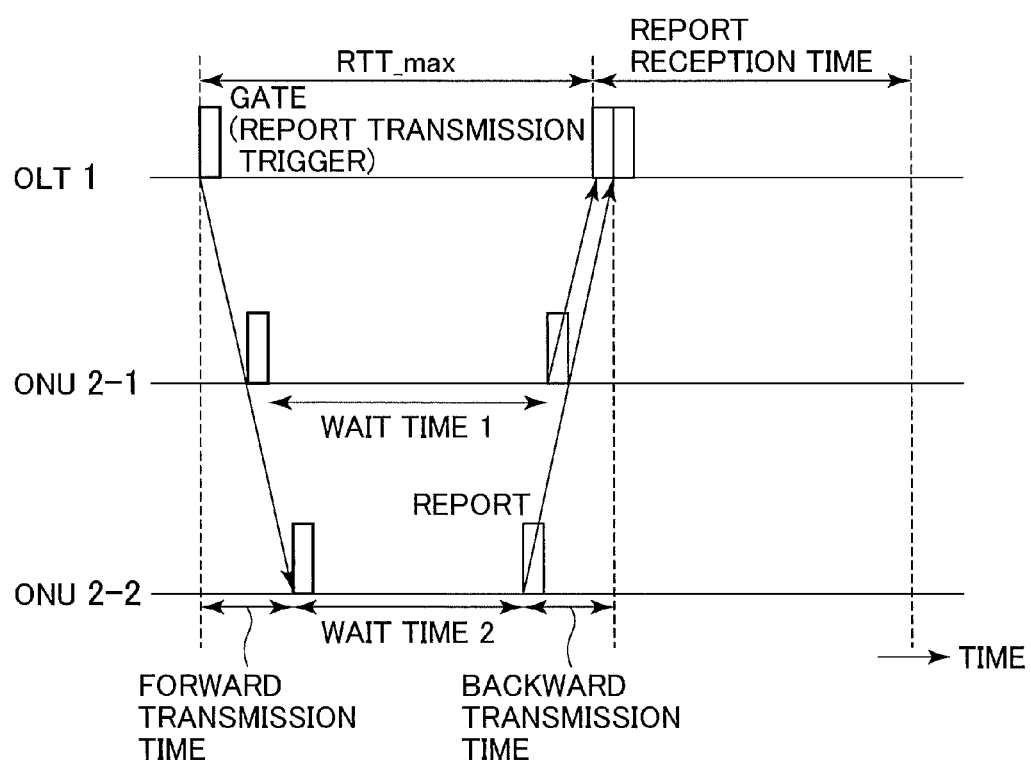
FIG. 1 is a time chart useful for understanding how a Gate and a Report frame are transmitted between an OLT and ONUs in the present invention.
Figure 2:
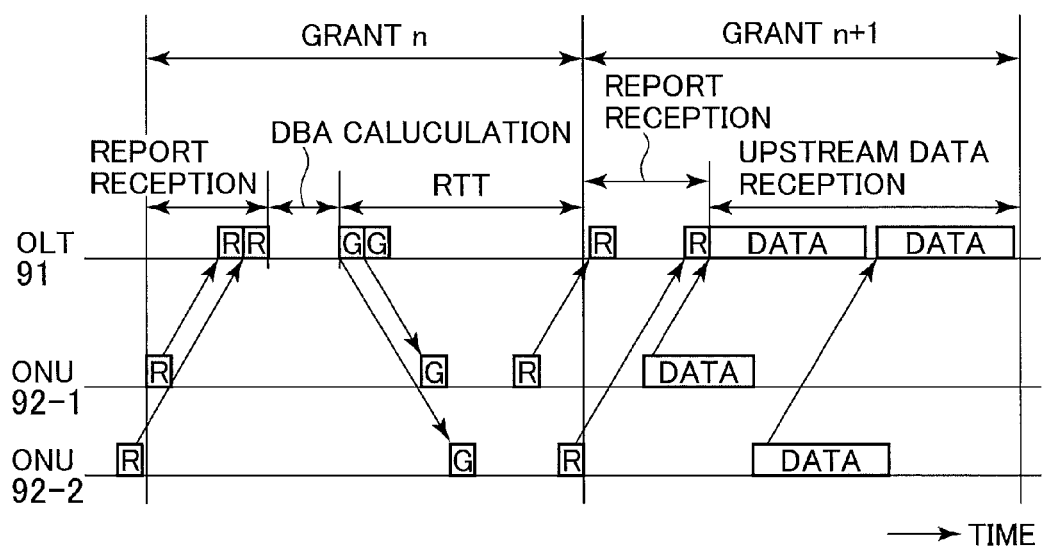
FIG. 2 is a time chart useful for understanding the DBA scheme.

With reference to FIG. 1, it will be described how Gate and Report frames are transmitted between an optical line terminal (OLT) and ONUs in the preferred embodiments. In the figure, the horizontal and vertical axes schematically represent time and a relative distance, respectively. More specifically, an ONU 2-2 is located further than an ONU 2-1 from an OLT 1. The ONUs 2-1 and 2-2 may generally be designated with a reference numeral 2.

In the access network system shown in FIG. 1, the OLT 1 informs all ONUs 2-1 and 2-2 of transmission timings therefore at once by transmitting a single Gate frame. The ONUs 2-1 and 2-2 each receive the Gate frame, and then wait during a wait period of time instructed in advance and corresponding to a Report transmission period of time. After the wait period of time lapses, the ONUs transmit a Report frame. This means that in the ONUs 2-1 and 2-2 the Gate frame functions as triggering the counting-up of the wait period of time.

The wait period of time to be instructed in advance to the ONU 2 is calculated by the OLT 1. The wait time may be calculated on the basis of round trip time of bi-directional transmission between the OLT 1 and ONU 2. In other words, the OLT 1 sets such a length of wait time as to increase with an increase in round trip time of transmission between the OLT 1 and an ONU 2, and vice versa.

The wait time can be calculated in various manners. For example, the following expression (1) can be applied.

$$\text{Wait time} = \text{RTT\_max} - RTT + (\text{Report size} \times \text{Order}) \quad (1)$$

where the RTT_max represents round trip time of transmission over the longest transmission distance in a communication system. For example, when the propagation delay is 5 ns/m and the longest transmission distance is 20 km, the Wait time will be set to 200 μs.

In the expression (1), the RTT represents round trip time of transmission between the OLT 1 and an ONU 2 at the position the ONU 2 is installed. For example, in the example shown in FIG. 1, the RTT is equal to a period of time corresponding to the round trip time of the bi-directional transmission over the distance between the OLT 1 and the ONU 2-1. For example, when the ONU 2-1 is 10 km away from the OLT 1 and the propagation delay is 5 ns/m, the RTT is set to 100 μs.

In the expression (1), the Report size is the temporal duration of a Report frame defined by the frame format shown in FIG. 3. The Order in the expression is a sequential order allotted in dependent on the distance between the OLT and an ONU. For example, in a system including one thousand ONUs, the nearest ONU is set as a zeroth ONU and so on to the farthest ONU as a 999th ONU. Conversely, the farthest ONU may be set as a zeroth ONU and so on to the nearest ONU as a 999th ONU.

The round trip time of transmission between the OLT 1 and an ONU 2 may depend on the distance between the OLT 1 and that ONU 2. The expression (1) is defined with the distance between the OLT 1 and an ONU 2 taken into account in advance in order to calculate the wait time for that ONU 2.

The wait time is determined on the basis of the expression (1), and then the ONUs 2 delay transmission of Report frames until the appropriate wait time thus determined lapses, thereby allowing the ONUs 2 to transmit Report frames without colliding therewith in the time division multiple access (TDMA) system.

Figure 4:
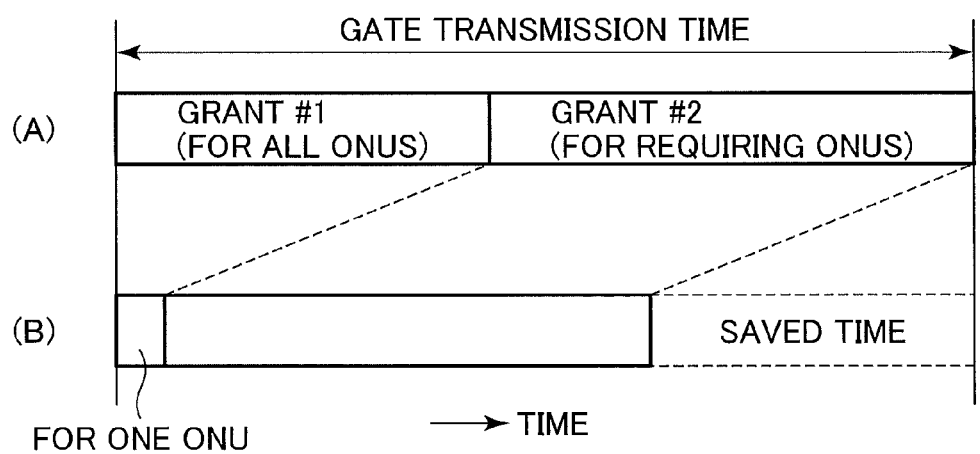
FIG. 4 is a time chart comparatively showing transmission time of downstream frames in accordance with the prior art and the present invention.

In this embodiment, the OLT 1 transmits a Gate frame only once. However, in a conventional manner shown in FIG. 4, line (A), the OLT 1 transmits to all ONUs 2 Gate frames for prompting them to transmit Report frames. In contrast, as seen from the line (B) in the figure, the instant illustrative embodiment allows the OLT 1 to transmit a Gate frame once, thereby saving the Gate transmission period of time accordingly. The saved period of time contributes to improvement on the efficiency of transmitting downstream data.

The OLT 1 prompts upstream traffic by transmitting a Gate frame after transmitting a Report transmission trigger. That Gate frame carries information on Start Time and Length in the field Grant #2, and is transmitted to the ONU 2 to which a band is allocated. In this embodiment, however, whenever all ONUs 2 are allocated to bands, the same number of Gate frames as the prior art will be transmitted, resulting in the same efficiency in transmitting downstream data as the prior art. The present embodiment is thus effective in improvement in transmission efficiency when the system includes at least one ONU 2 that is not allocated to a band.

Figure 5:
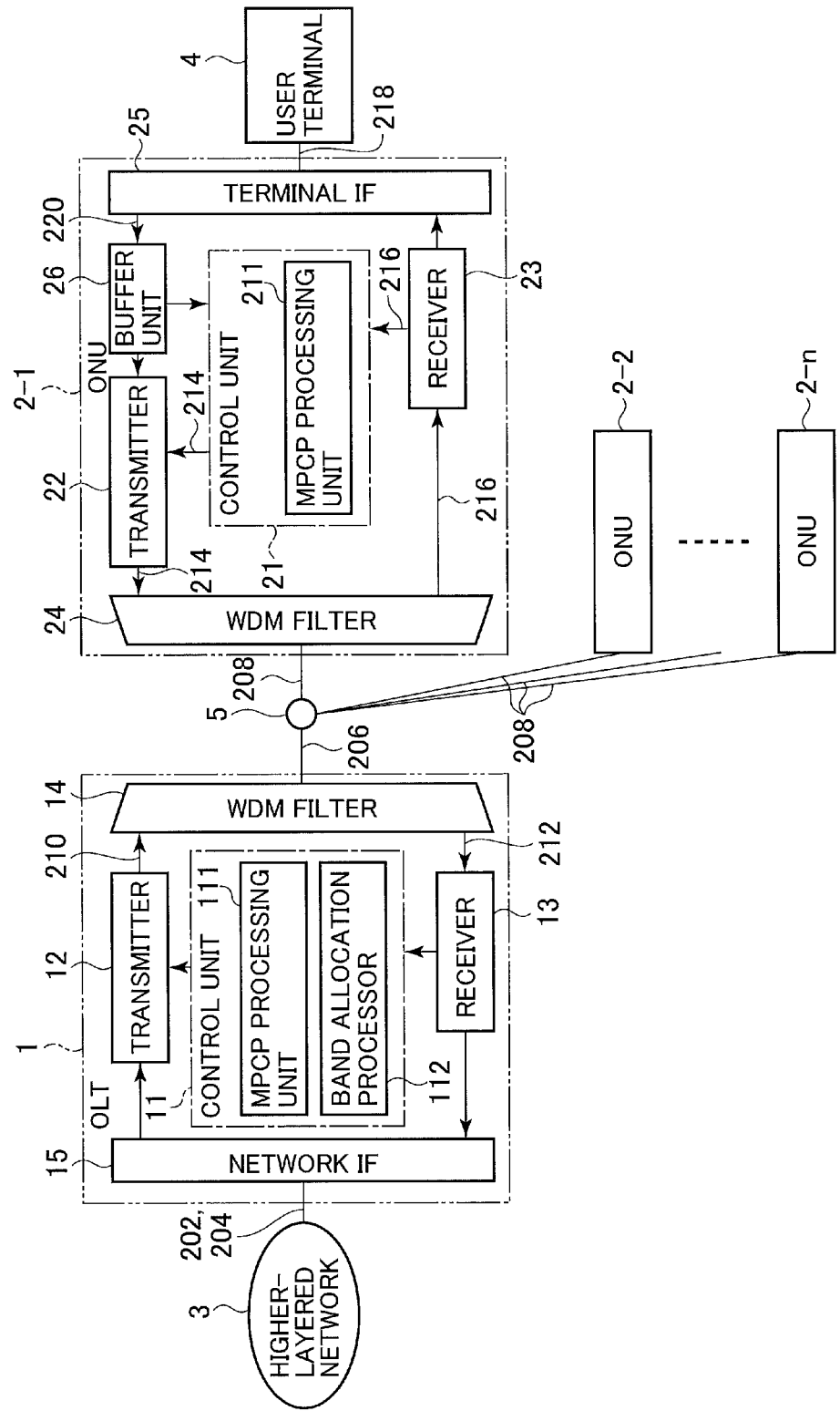
FIG. 5 schematically shows the entire configuration of an optical access network system based on the GE-PON and the internal configuration of an OLT together with ONUs in accordance with an illustrative embodiment of the present invention.

Now, reference will be made to FIG. 5 to describe in detail the illustrative embodiment of transmission apparatus where the present invention may advantageously be applied to an optical access system using a GE-PON. FIG. 5 shows the entire configuration of the optical access system using the GE-PON and the internal configuration of the OLT and the ONU. The illustrative embodiment may also be applied to other types of optical access system such as 10 GE-PON having its data rate equal to 10 Gbps.

In the figure, the optical access system 10 includes the OLT 1, a plurality of ONUs 2-1 to 2-$n$, where n is a positive integer, and an optical splitter 5, which are connected by optical fiber cables 206 and 208 as illustrated. Again, those ONUs may generally be designated with a reference numeral 2.

The optical access system 10 is a telecommunications network system configured to establish a one-to-n connection between the OLT 1 and the ONUs 2 over the optical fiber cables 206 and 208. The optical access system 10 may be implemented by standardization such as IEEE 802.3ah.

The OLT 1 is a line terminating unit provided in a station of a telecommunications carrier, i.e. central office, for example. The OLT 1 is connected on one hand to the ONUs 2 through the optical splitter 5 and on the other hand to a higher-layered network 3. More specifically, the OLT 1 is adapted to transmit data 202 received from mating communication devices under communication, i.e. the ONUs 2, to the higher-layered network 3 and data 204 from the higher-layered network 3 to the ONUs 2. That allows user terminals 4 such as personal computers or measuring instruments connected to the ONUs 2 can make access to the higher-layered network 3. In the GE-PON, communications between the OLT 1 and the ONUs 2 may be implemented by MAC (Media Access Control) frames. Therefore, this communication system has a high affinity with Ethernet, which implements communications by means of MAC frames as well.

The ONUs 2 are line terminating units located in the premises of users or subscribers, for example. The ONUs 2 are connected on one hand to the OLT 1 through the optical splitter 5 by the optical fiber cables 208 and on the other hand to the user terminals 4 by optical fiber cables 218. FIG. 5 shows the ONU 2-1 connected to one user terminal 4 as an example. However, the ONU 2-1 may be connected to two or more user terminals 4. That is also the case with the remaining ONUs 2-2 to 2-$n$.

The optical splitter is adapted for splitting an optical signal 206 from the OLT 1 into multiple optical signals to transmit the latter signals to the ONUs 2, and combining optical signals 208 from the ONUs 2 into a single optical signal to transmit the combined optical signal to the OLT 1. The optical splitter 5 may be implemented by any kinds of optical devices for splitting and combining an optical signal. Signals and data are designated with reference numerals of connections conveying the signals and data.

In FIG. 5, the OLT 1 includes a control unit 11, a transmitter 12 for transmitting a frame 210 under the control of the control unit 11, a wavelength division multiplexing (WDM) filter 14 for transmitting and receiving a wavelength division multiplex signal 206, a receiver 13 for receiving a frame 212 carried by a signal received from the WDM filter 14, and a network interface (IF) 15 for transmitting and receiving signals 202 and 204 to and from the higher-layered network 3, those components being interconnected as depicted.

The control unit 11 serves to control the functions of the entire OLT 1. The control unit 11 may consist of, for example, a central processor unit (CPU), a read-only memory (ROM), a random-access memory (RAM), an electrically erasable programmable ROM (EEPROM), an input interface and an output interface. The functions of the OLT 1 may be implemented through software. Namely, the CPU reads program sequences stored in the ROM, and executes the program sequences with proper data to thereby implement the functions of the OLT 1. In this connection, the word "circuit" or "device" may be understood not only as hardware, such as an electronics circuit, but also as a function that may be implemented by software installed and executed on a computer.

The control unit 11 includes a multi-point control protocol (MPCP) processing unit 111 and a band allocation processor 112 as its important functional sections.

The MPCP processor 111 serves as controlling communications with ONUs 2 connected thereto. Specifically, the MPCP processing unit 111 establishes a communication path between the OLT 1 and an ONU 2, and then producing a Gate frame for each of the ONUs 2 and reading out a Report frame from each of the ONUs 2.

Figure 6:
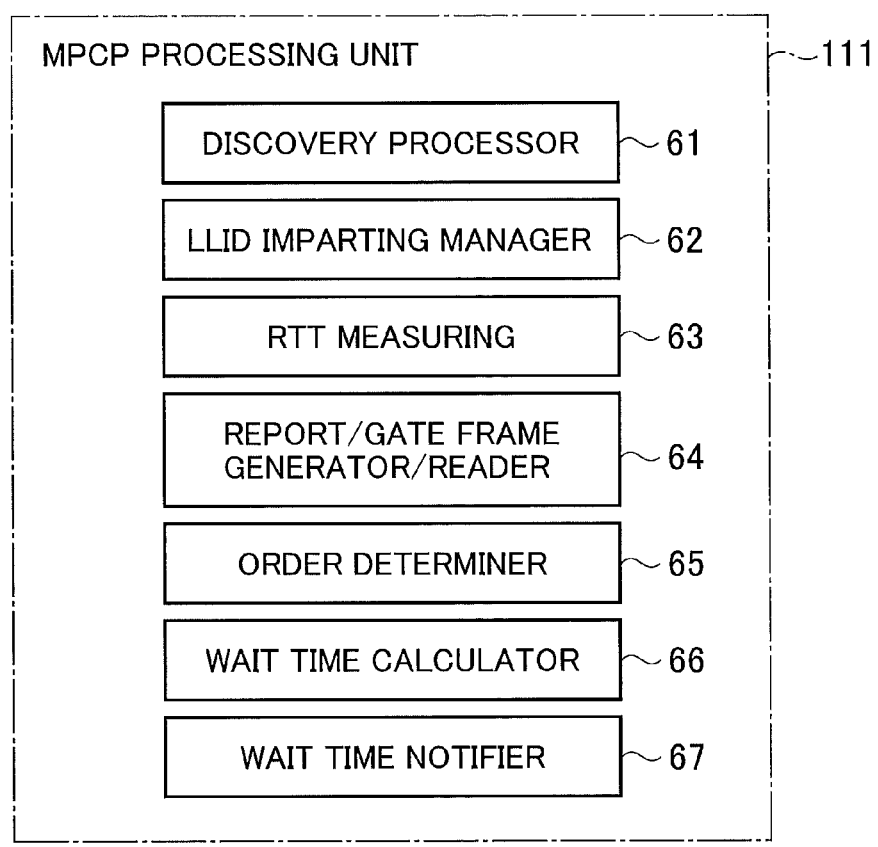
FIG. 6 is a detailed functional block diagram showing the functional components of a multi-point control protocol (MPCP) processing unit in the illustrative embodiment shown in FIG. 5.

FIG. 6 is a functional block diagram showing the functional components of the MPCP processing unit 111 in detail. As shown in the figure, the MPCP processing unit 111 includes a discovery processor 61, a logical link identification (LLID) allotting manager 62, an RTT measuring subsection 63, a Report/Gate frame generator/reader 64, an order determiner 65, a wait time calculator 66, and a wait time notifier 67.

In FIG. 6, the discovery processor 61, the LLID allotting manager 62, the RTT measuring subsection 63 and the Report/Gate frame generator/reader 64 may be implemented in the form standardized in IEEE 802.3av/ah. Std.

It is important to note that the order determiner 65, the wait time calculator 66 and the wait time notifier 67 are functional components specifically in accordance with the invention. The processing by the order determiner 65, the wait time calculator 66 and the wait time notifier 67 will be described later in detail in connection with the description on the operation.

The band allocation processor 112 functions to allocate a band and a transmission start timing to each of the ONUs 2, and notify the associated ONUs 2 of a transmission permission signal containing the band and the transmission start timing. This can prevent congestion of signals transmitted from the ONUs 2. The band allocation processor 112 may be implemented by means of, for example, dynamic bandwidth allocation (DBA) control standardized by IEEE 802.3.

Returning to FIG. 5, the ONU 2 includes a control unit 21, a transmitter 22 for transmitting a frame 214 under the control of the control unit 21, a WDM filter 24 for transmitting and receiving a WDM signal 208, a receiver 23 for receiving a frame 216 carried on a signal received from the WDM filter 24, a terminal interface (IF) 25 for transmitting and receiving a signal 218 to and from the user terminals 4, and a buffer 26 for storing information on the data volume 220 of transmission frames to be transmitted. The ONU 2-1 to 2-$n$ may be the same in configuration as each other, and hence only the ONU 2-1 is depicted in detail in the figure.

The control unit 21 is adapted to control the functions of the entire GNU 2. As may be the same as the OLT 1, the control unit 21 may consist of, for example, a CPU, a ROM, a RAM, an EEPROM, an input interface and an output interface. The functions of the ONU 2 may be implemented through software. Namely, the CPU reads out program sequences stored in the ROM, and executes the program sequences with proper data to thereby implement the functions of the ONU 2.

The control unit 21 includes as its substantial portion an MPCP processing unit 211 for controlling communication with the OLT 1. The MPCP processing unit 211 serves to write information on the data volume of transmission frames stored in the buffer 26 into a Report frame to transmit the Report frame to the OLT 1. The MPCP processing unit 211 also serves to process transmission of transmission frames 214 on the basis of a band defined in a Gate frame 216 received from the OLT 1.

Figure 7:
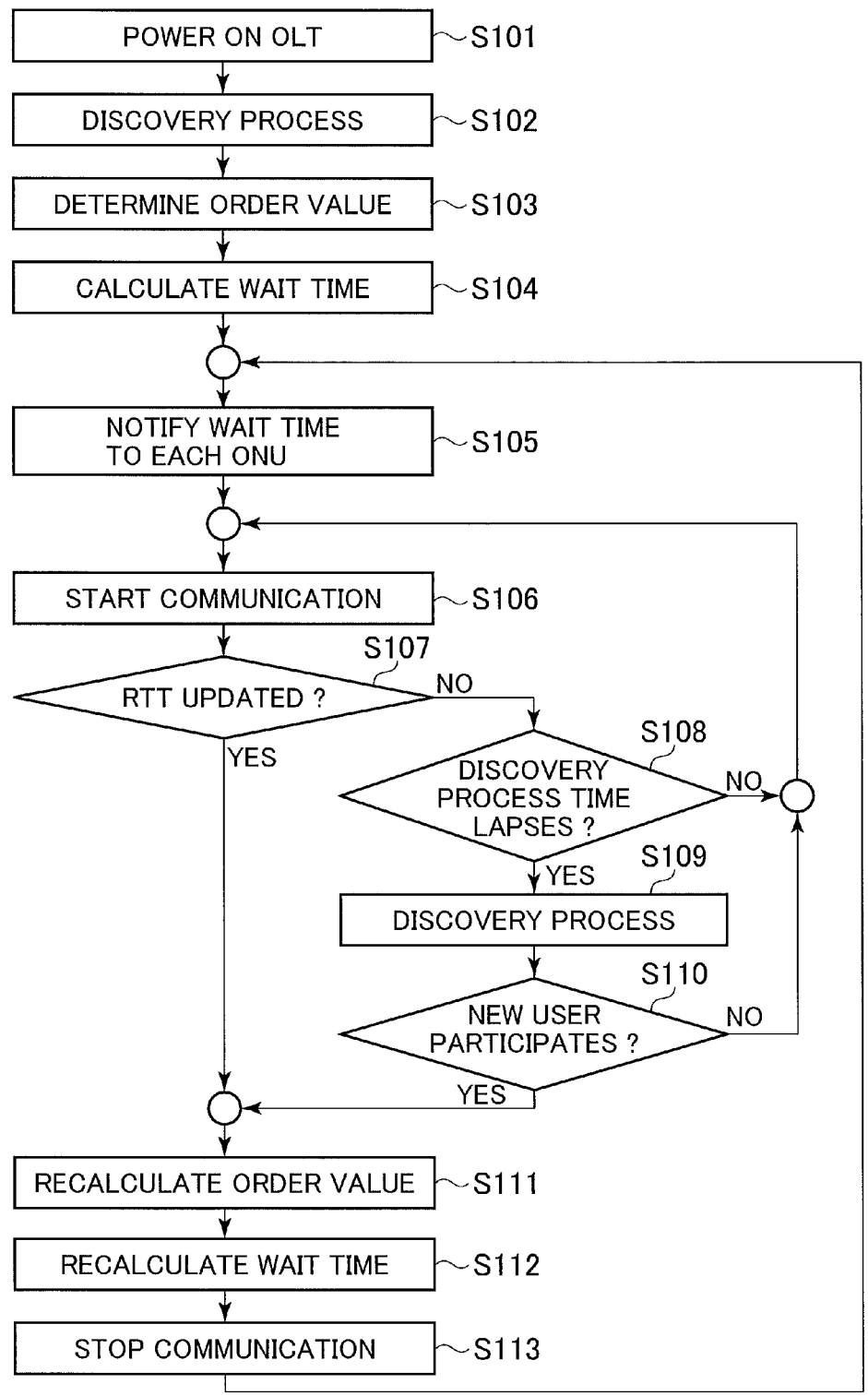
FIG. 7 is a flowchart useful for understanding the operation of transmission controlled by an OLT in the illustrative embodiment.

Next, the operation of transmission processes controlled by the OLT 1 in the illustrative embodiment will be described with reference to FIG. 7. FIG. 7 is a flowchart for use in describing the operation of transmission processes controlled by the OLT 1 in the illustrative embodiment.

In the figure, when the OLT 1 is powered on (S101), the discovery processor 61 performs a discovery process to detect the ONUs 2 (S102). A discovery process applicable to the discovery processor 61 may be such that, for example, the OLT 1 transmits and receives a control frame for use in discovery to and from the ONUs 2 connected to the OLT 1. Whenever the ONU 2 is detected, the LLID allotting manager 62 allots identifications, i.e. LLIDs with the embodiment, specifically to the respective detected ONUs 2. At this time, in order to perform TDMA control on upstream data, the RTT measuring subsection 63 measures a distance between the OLT 1 and each of the detected ONUs 2, i.e. RTT. These processes are standardized in IEEE 802.3av/ah. Std.

Next, the order determiner 65 uses the RTT value of each of the ONUs 2 measured in the discovery process to determine the Order value of that ONU 2 (S103). Specifically, the order determiner 65 rearranges the ONUs 2 in the descending order of the RTT numbers thereof, and allocates values of "0" to "N−1" respectively to the Order values of the rearranged ONUs 2, where N is a natural number representing the total number of the ONUs 2 currently connected.

If two or more ONUs 2 have the same RTT value, then they are rearranged in such an order that an ONU 2 having its LLID smaller in value than others appears before another ONU 2 having its LLID larger. For example, when one ONU 2 having its LLID=1 and another ONU 2 having its LLID=10 are of the same RTT value equal to 100 μs, they are allotted to the Order values such that the one ONU 2, having its LLID=1, is rearranged in the order prior to the other ONU 2, having its LLID=10.

Subsequently, the wait time calculator 66 calculates the wait time of each ONU 2 (S104). In order to calculate the wait time of each ONU 2 in the embodiment, the wait time calculator 66 uses the expression (1), for example. When calculating the wait time, the wait time calculator 66 uses the RTT values of the respective ONUs 2 acquired in the discovery process and the Order values of the respective ONUs 2 determined by the order determiner 65.

The remaining parameters, i.e. RTT max and Report size, in the expression (1) are operational parameters specific for the GE-PON system, i.e. semi-permanent values basically not changed once set in the system, as fixed when the OLT 1 is powered on. The wait time calculator 66 uses those parameters to compute the wait time of the respective ONUs 2.

Thence, the wait time notifier 67 notifies the respective ONUs 2 of the wait time thus calculated (S105). More specifically, the wait time notifier 67 sets in a Gate frame the identification, LLID, identifying, each ONU 2 and the wait time for that ONU 2, and transmits the Gate frame to that ONU 2. At this time, the Gate frame is assembled such that its field "Opcode", FIG. 3B, contains a value representing that the wait time is set in this frame.

The above operational sequence causes the respective ONUs 2 to be notified of the wait time prior to establishing communications between the OLT 1 and the ONUs 2. The respective ONUs 2 store information on the wait time thus notified.

Next, communications start between the OLT 1 and the ONUs 2 (S106). The communications are established through a dynamic bandwidth allocation process performed by the band allocation processor 112. In detail, the band allocation processor 112 finds a band to be allocated to each ONU 2, depending upon information on a traffic volume contained in the Report frame received from each ONU 2. Then, the MPCP processing unit 111 sets the allocated band for each ONU 2 to a Gate frame for notification.

Figure 8:
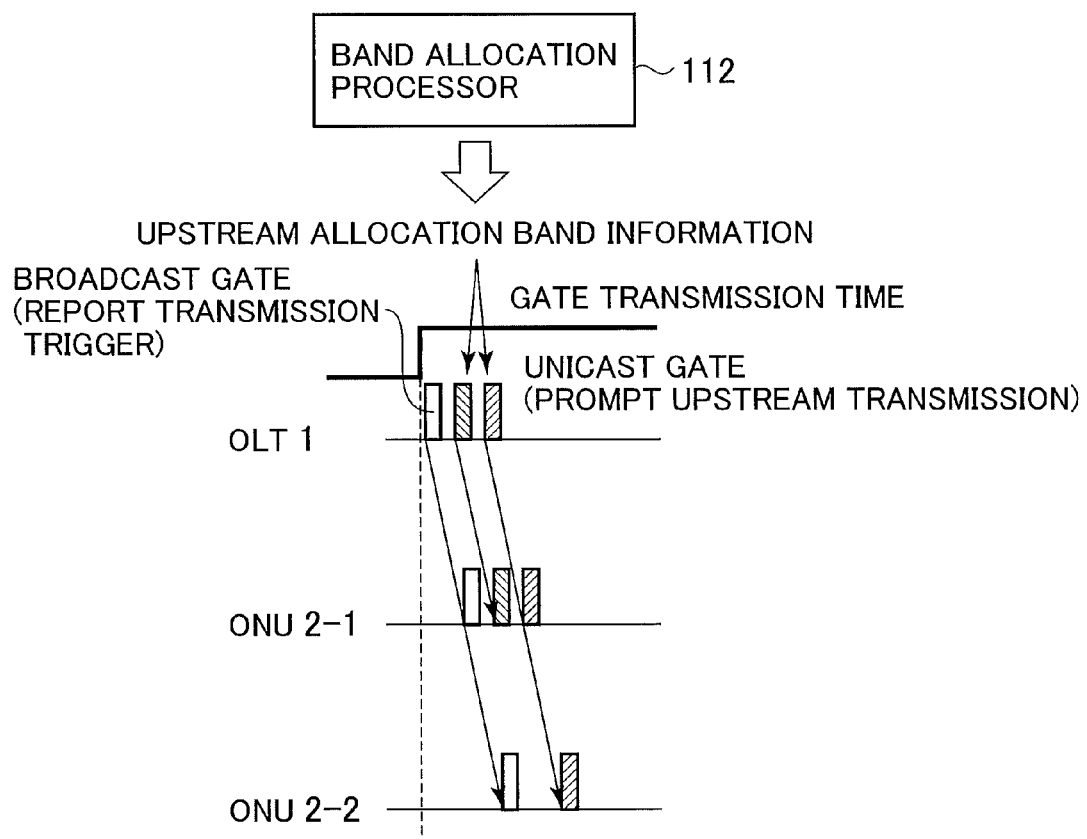
FIG. 8 is a chart useful for understanding how the OLT transmits Gate frames.

Additionally with reference to FIG. 8, it will be described how the OLT 1 transmits Gate frames. The MPCP processing unit 111 will first transmit a Gate frame for use in a Report transmission trigger. The MPCP processing unit 111 broadcasts a signal carrying the Gate frame to every ONU 2. Specifically, an LLID for use in broadcast is set in advance, and the MPCP processing unit 111 will use the LLID for use in broadcast to transmit a Gate frame. In order to represent that the Gate frame functions as a trigger signal, the MPCP processing unit 111 sets a value representing that the frame functions as a trigger signal in the field of "Opcode" of the Gate frame, FIG. 3B, to transmit the Gate frame.

Then, the MPCP processing unit 111 sets the result of calculation of upstream band allocation for each ONU 2 in a Gate frame, and transmits the Gate frame to that ONU 2 through unicast.

When each ONU 2 has received the Gate frame for use in Report transmission trigger and the wait time for that ONU 2 lapses since the reception, it will transmit a Report frame including information on a buffer volume stored in the buffer 26 of that ONU 2 to the OLT 1.

During communication also, the RTT measuring subsection 63 periodically measures the RTT values of those ONUs 2. If the RTT value varies, it is updated in step S107, FIG. 7. When the RTT value is updated, the order determiner 65 uses the RTT values of the ONUs 2, including the updated RTT value or values, to renew the Order values (S111). Next, the wait time calculator 66 recalculates the wait time of each ONU 2 (S112). At this time, the control unit 11 temporarily stops communication (S113), and then the process moves to step S105. In the step S105, the updated wait times of those ONUs 2 are informed to the respective ONUs 2, and the communication will restart (S106).

If the RTT value is not updated, the communication continues between the OLT 1 and the ONUs 2. At this time, in order to automatically recognize a newly participating user, the discovery processor 61 periodically performs the discovery process S109 after a predetermined discovery process period of time lapses (S108).

Then, if a new user is added, i.e. the discovery processor 61 detects a new ONU 2 participating (S110), then the control unit 11 transfers the process to step S111. In the step S111, the order determiner 65 uses the RTT values of the ONUs 2, including the RTT value of the new ONU 2, to recalculate the Order values. The wait time calculator 66 recalculates the wait time of each ONU 2 (S112). Then, the communication temporarily halts, and the process returns to the step S105. The wait time notifier 67 then notifies the ONUs 2 of the wait time to restart the communication.

In the instant illustrative embodiment, the communication may stop only if the RTT value is updated, or a new user participates. Otherwise, the communication continues. Thus, unless changes frequently occur in the connections between the OLT 1 and the ONUs 2, the OLT 1 is free from a heavy calculation load on the processes for determining Order, and calculating and notifying wait time, which are the processes specific to the invention.

Next, an example of the transmission control processes in the illustrative embodiment will be described further with reference to FIGS. 9, 10 and 11. Improvement in efficiency of transmitting downstream data in the embodiment will be described by means of numerical calculation. In the calculation, it is assumed that the communication is completed up to the step S106 in the flowchart shown in FIG. 7.

Figure 9:
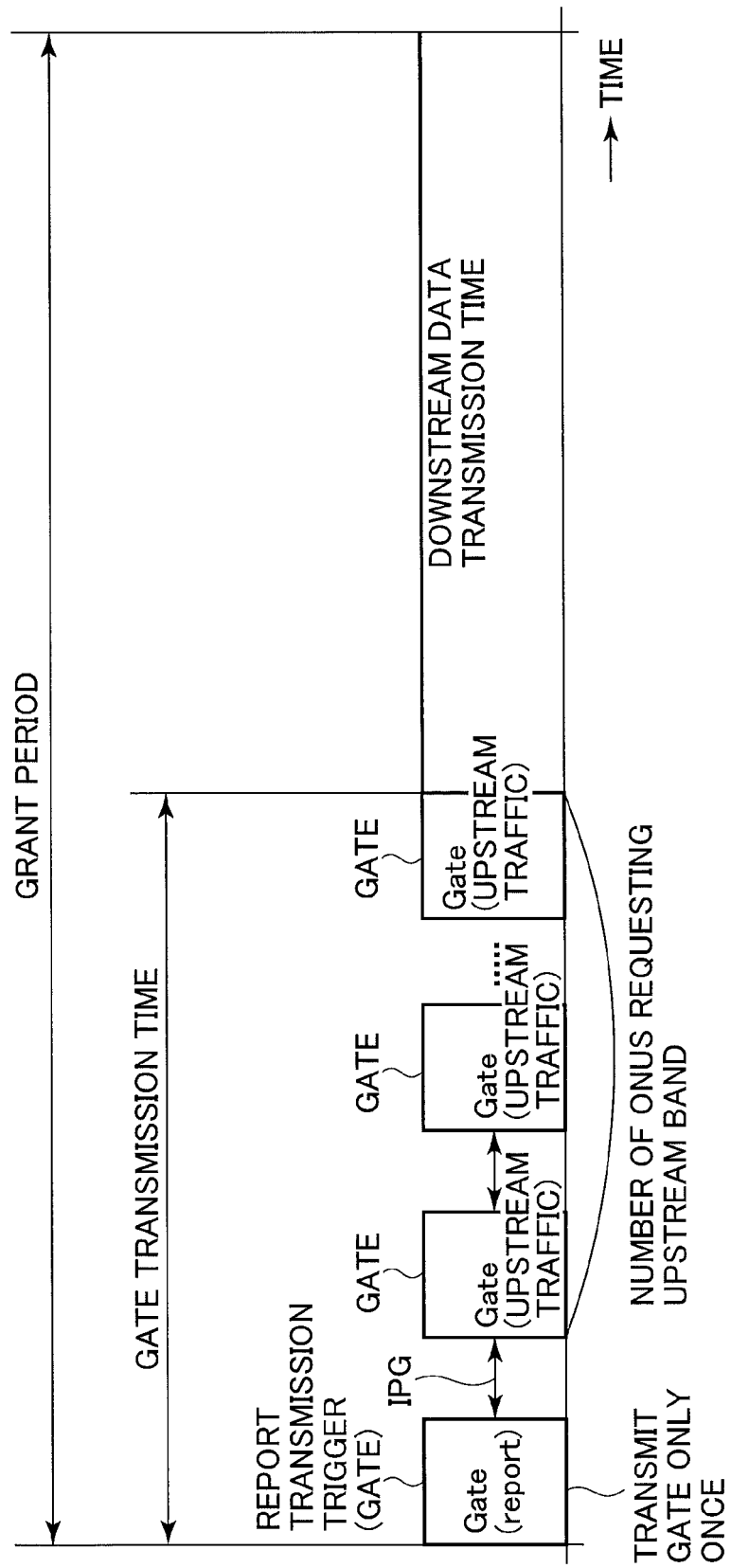
FIG. 9 is a chart useful for understanding how to transmit downstream frames in a model with the embodiment.

Downstream communication will be performed on the frame model shown in FIG. 9. According to the frame model, the OLT 1 transmits a Report transmission trigger only once. After an IPG period lapses, the OLt 1 transmits Gate frames prompting upstream traffic the same number of times as the ONUs having requested upstream band allocation.

Then, downstream data are transmitted. The efficiency of transmitting downstream data may be defined as the ratio of a downstream data transmission time to a grant period, given by the following relationship:

Downstream data transmission efficiency [%]=(Downstream data transmission time×100)/Grant period (2)

According to FIG. 9, the downstream data transmission time is found by an expression (3):

Downstream data transmission time=Grant period−Gate transmission time (3)

According to the expressions (2) and (3), shortening a Gate transmission time increases the efficiency of transmitting downstream data.

Figures 10, 11:
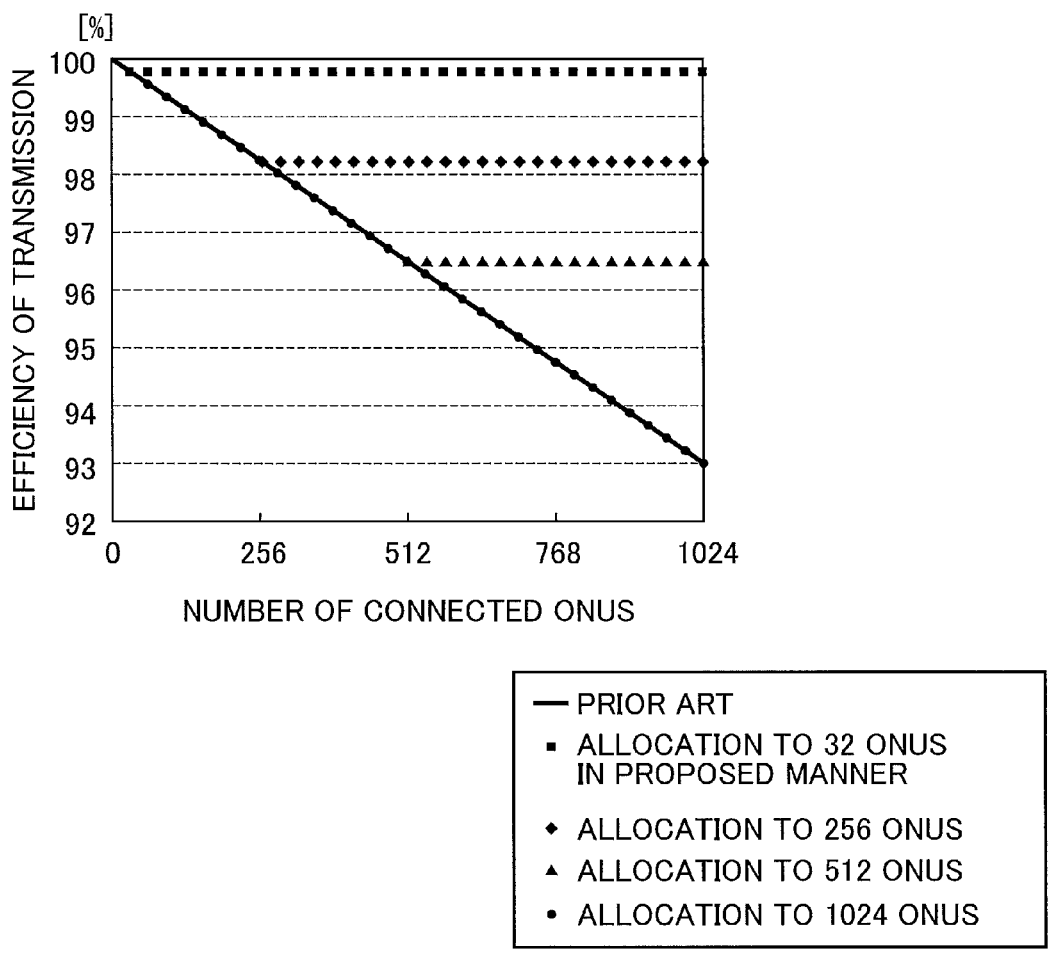
FIG. 10 shows parameters for use in verifying the illustrative embodiment.
FIG. 11 plots the efficiency of transmitting downstream data calculated by using the parameters shown in FIG. 10 in the embodiment.

FIG. 10 shows parameters used in verifying the illustrative embodiment. As shown in the figure, the data rate is set to 10 [GHz], the grant period to 1000 [μs], the Gate frame size to 51.2 [ns], and the IPG to 9.6[ns].

FIG. 11 plots the efficiency of transmitting downstream data calculated on the values of the parameters shown in FIG. 10. In FIG. 11, the horizontal and vertical axes represent the maximum number of connected ONUs and the efficiency of transmitting downstream data [%], respectively. The solid line indicates the efficiency of transmitting downstream data resultant from the prior art under the same condition. In this example, the number of ONUs 2 to be allocated to upstream bands is variable.

According to FIG. 11, on the vertical line corresponding to 1024 ONUs as the maximum number of connected ONUs, the prior art is decreased to about 93% in the efficiency of transmitting downstream data.

By contrast, in the proposed solution, or illustrative embodiment, when bands are allocated to, for example, 32 of the 1024 ONUs 2, the efficiency of transmitting downstream data is decreased to only about 99.77%. Even when bands are allocated to 512 ONUs 2, half as many as the 1024 ONUs 2, the efficiency of transmitting downstream data in this embodiment is decreased to only about 96.5%. When bands are allocated to all the 1024 ONUs 2, the efficiency of transmitting downstream data in this embodiment is equal to that in the prior art. In the verification, the data rate is set to 10 G bps, so that the efficiency of transmitting downstream data of 1% corresponds to 100 Mbps.

This result reveals that the illustrative embodiment is effective in improvement of the efficiency of transmitting downstream data over a telecommunications network system branching into many networks. The above numerical calculation is based on a 10 GE-PON having its data rate equal to 10 Gbps. The illustrative embodiment is also effective in the improvement on a network having its data rate equal to 1 Gbps, i.e. GE-PON.

In summary, according to the illustrative embodiment, the OLT informs the wait time for each ONU in advance, and transmits a frame for use in Report transmission trigger. Thereafter, Gate frames are transmitted only to ONUs allocated to upstream bands. That can improve the efficiency of transmitting downstream data.

Next, reference will be made to FIG. 12 to describe in detail a transmission control apparatus in accordance with an alternative embodiment of the invention. The alternative embodiment may be applied to an optical access system using a WDM/TDM-PON (Wavelength Division Multiplexing/Time division Multiplexing-PON) as one of the next-generation optical access communication systems. The alternative embodiment may not be restricted to the WDM/TDM-PON. For example, the embodiment can be applied to a WDM/TDM-PON using a wavelength-variable laser or array waveguide gratings (AWG).

Figure 12:
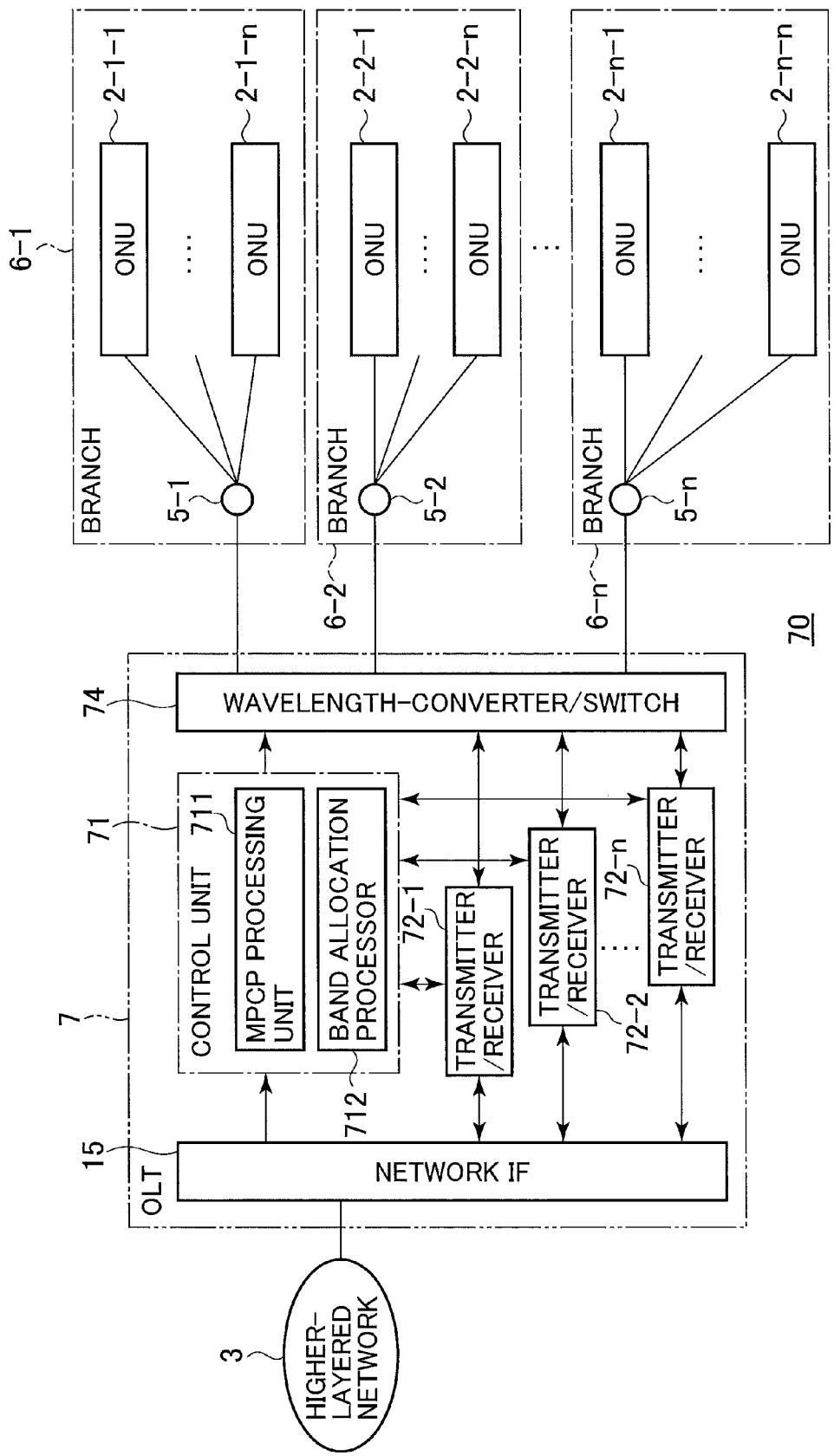
FIG. 12 schematically shows, like FIG. 5, the entire configuration of an optical access network system based upon a WDM/TDM-PON (Wavelength Division Multiplexing/Time division Multiplexing-PON) and the internal configuration of an OLT together with ONUs in accordance with an alternative embodiment of the invention.

FIG. 12 shows the entire configuration of the optical access network using the WDM/TDM-PON and the internal configuration of the OLT and the ONU in the alternative embodiment. Of course, like components and elements are designated with the same reference numerals, and repetitive descriptions thereon will be refrained from. The following detailed description will be focused on the configuration specific to the alternative embodiment.

As shown in FIG. 12, the optical access system 70 in accordance with the alternative embodiment generally includes an OLT 7 and a plurality of optical splitters 5-1 to 5-$n$ in addition to the plurality of ONUs 2, which are connected by optical fiber cables.

The OLT 7 is adapted to perform optical communication with the ONUs 2 on plural wavelengths through WDM/TDMA. This system configuration is specifically characterized by the single OLT 7 capable of collectively dealing with the ONUs 2 having the appearances thereof on plural branches carrying wavelengths different from each other. That allows the single OLT 7 to effectively manage plenty of ONUs 2.

As shown in FIG. 12, the OLT 7 includes a control unit 71, transmitter/receivers 72-1 to 72-$n$, a wavelength-converter and switch 74, and a network-side IF 15, which are interconnected as illustrated.

The control unit 71 is adapted for controlling the entire functions of the OLT 7. The control unit 71 includes an MPCP processing unit 711 and a band allocation processor 712.

The MPCP processing unit 711 is adapted to calculate the wait periods of time for the ONUs 2, described in connection with the illustrative embodiment shown in FIG. 5, for each of the branches 6-1 to 6-$n$, i.e. wavelengths $\lambda 1$ to $\lambda n$. More specifically, the MPCP processing unit 711 calculates the wait periods of time for the ONUs 2 contained in each of the branches 6-1 to 6-$n$. The branches may be identified on the basis of the wavelengths allocated to the respective branches 6-1 to 6-$n$ or the unique IDs, or LLIDs, allocated to the respective ONUs.

The MPCP processing unit 711 serves as assembling, for each of the branches 6-1 to 6-$n$, i.e. wavelengths $\lambda 1$ to $\lambda n$, a Gate frame including the wait periods of time of the ONUs 2 in that branch. The Gate frames thus assembled for each branch will be transmitted to the ONUs 2 in that branch to thereby notify those ONUs 2 of the wait time.

The MPCP processing unit 711 is also adapted to assemble a frame including Report transmission trigger for each of the branches 6-1 to 6-$n$ to transmit them to the branches 6-1 to 6-$n$. As frames including Report transmission trigger for the branches may be Gate frames, as with the illustrative embodiment shown in and described with reference to FIG. 5.

The MPCP processing unit 711 may be configured similarly to the MPCP processing unit 111, FIG. 6, of the illustrative described earlier. In the instant alternative embodiment, the order determiner 65 shown in FIG. 6 may be adapted to determine, for each of the branches 6-1 to 6-$n$, an Order value on the basis of the RTT values of the ONUs 2 belonging to that branch.

The wait time calculator 66 serves to calculate for each of the branches 6-1 to 6-$n$ the wait times of the ONUs 2 in that branch.

The wait time notifier 67 serves to assemble for each branches 6-1 to 6-$n$ a Gate frame, i.e. frame for use in Report transmission trigger, including the wait times calculated for the ONUs contained in that branch.

The band allocation processor 712 functions as band allocation calculation having an item of a wavelength added thereto to dynamically allocate bands to the ONUs 2 contained for each of the wavelengths $\lambda 1$ to $\lambda n$, i.e. branches 6-1 to 6-$n$.

The band allocation by the band allocation processor 712 may be implemented by a variety of manners so far as they can distinguish wavelengths and allocate bands for each wavelength to the ONUs 2 using that wavelength. For example, a dynamic wavelength and bandwidth allocation (DWBA) function described in Kazutaka Hara, et al., "Flexible load balancing technique using dynamic wavelength bandwidth allocation (DWBA) toward 100 Gbit/s-class-WDM/TDM-PON", ECOC 2010, Tu.3.B2, September, 2010 may be applied.

The transmitter/receivers 72-1 to 72-$n$ are adapted to transmit and receive frames to and from ONUs 2 connected to each of the branches 6-1 to 6-$n$. For example, with reference to FIG. 12, the transmitter/receiver 72-1 transmits and receives frames to and from the ONUs 2 contained in a branch 6-1, i.e. on the wavelength $\lambda 1$, and the transmitter/receiver 72-2 transmits and receives frames to and from the ONUs 2 contained in a branch 6-2, i.e. on the wavelength $\lambda 2$.

The wavelength-converter and switch 74 has the functions to convert the wavelength of signal light received or transmitted, and to switch the connections between the ONUs 2 contained in the respective branches 6-1 to 6-$n$ and the transmitter/receivers 72-1 to 72-$n$ under the control of the control unit 71.

Next, it will be described how the OLT 7 in the alternative embodiment proceeds to transmission control in detail further with reference to FIGS. 13 and 14. At first, it will be described how the OLT 7 collectively dealing with ONUs 2 on a WDM/TDM-PON system.

The OLT 7 on the WDM/TDM-PON system uses plural wavelengths to thereby allow the single OLT 7 to deal with the plural branches each containing the ONUs 2.

In the present alternative embodiment, the band allocation processor 712 uses a DWBA function to enable a single transmitter/receiver to efficiently accommodate lots of ONUs 2. This configuration may comply with a situation, for example, where each branch contains a few ONUs 2 currently under communication so that the entire bands on which the ONUS 2 are communicating across all branches in the system are fewer than the maximum communication bands for one branch. In such a case, one transmitter/receiver can sufficiently deal with all ONUs 2 to improve the efficiency in utilizing the band resources, rather than all the transmitter/receivers being rendered operative, saving the electric power consumption.

Figure 13:
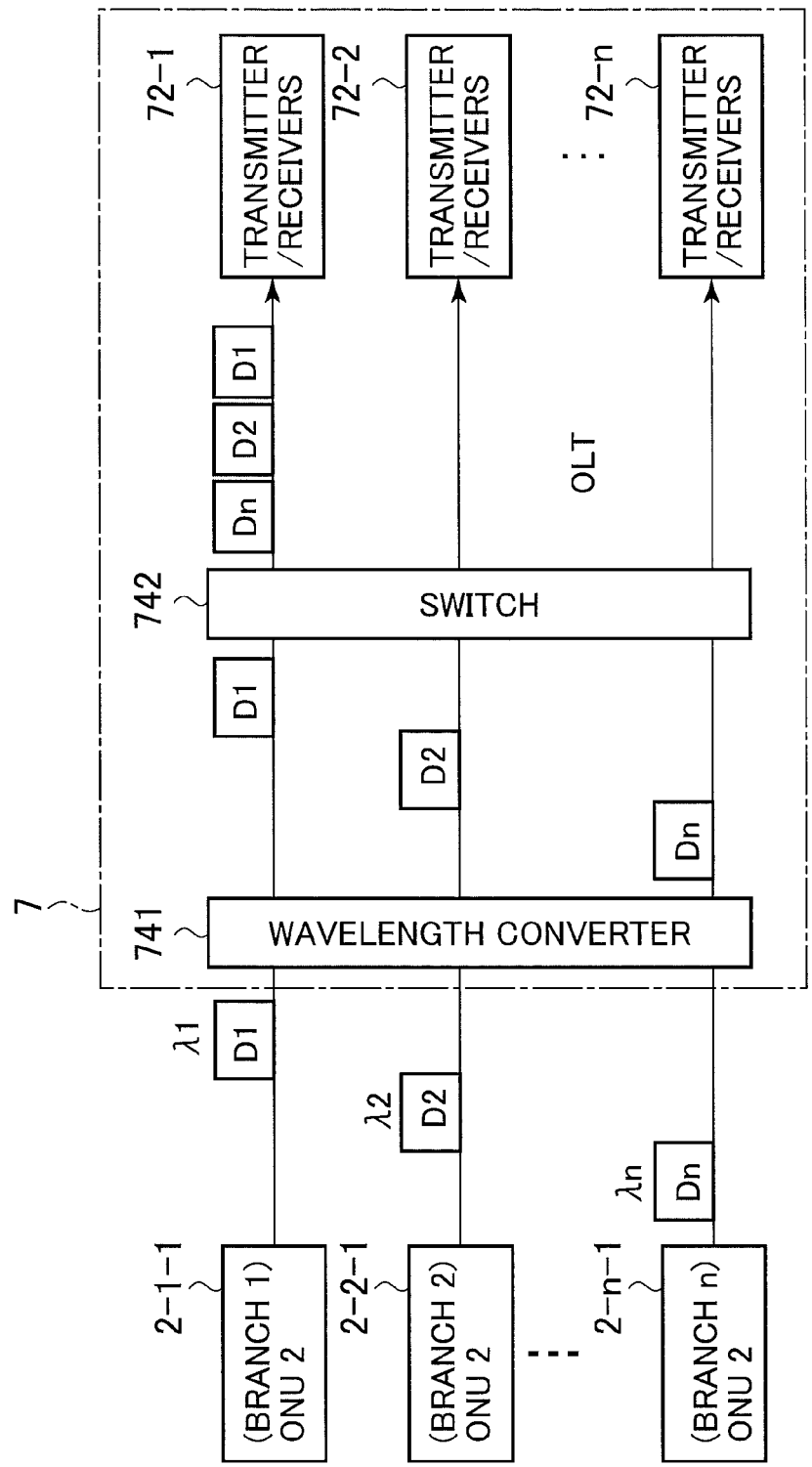
FIG. 13 is a schematic block diagram useful for understanding how the OLT collectively deals with the ONUs in accordance with the alternative embodiment.

Referring to FIG. 13, it will be described how the OLT 7 intensively manages the entire ONUs 2. FIG. 13 shows, as an example, a situation that signal transmission and reception to and from all the ONUs 2-1-1, 2-2-1 and 2-$n$-1 contained in the entire branches are dealt with by one of the transmitter/receivers, i.e. 72-1. Additionally, for description, the wavelengths $\lambda 1$, $\lambda 2$ and $\lambda n$, are allocated to the branches 6-1, 6-2 and 6-$n$, respectively. In the OLT 7, the transmitter/receivers 72-1, 72-2 and 72-$n$ transmit and receive signals on the wavelengths $\lambda 1$, $\lambda 2$ and $\lambda n$, respectively.

In upstream transmission, signals from the ONUs 2 are wavelength-converted by a wavelength converter 741. For example, the ONU 2-2-1 in the branch 6-2 transmits signals on the wavelength $\lambda 2$. The wavelength converter 741 converts the wavelength of the signals of the ONU 2-2-1 from the wavelength $\lambda 2$ to the wavelength $\lambda 1$.

The wavelength converter 741 may perform the wavelength conversion, for example, under the control of the control unit 71. In the example shown in FIG. 13, one of the transmitter/receivers, e.g. 72-1, may be fixed in advance for collectively treating the ONUs 2, and the control unit 71 instructs the wavelength converter 741 to switch the wavelength of incoming signals to the wavelength allocated to that transmitter/receiver 72-1 thus fixed as collectively dealing with signals. Of course, the optical signals from the ONU 2-1-1 on the branch 6-1 are not converted by the wavelength converter 741 because they are originally received on the wavelength $\lambda 1$ on the branch 61-1.

The signal converted into the wavelength $\lambda 1$ by the wavelength converter 741 is supplied to the switch 742. The switch 742 switches all the inputted signals to be fed to the transmitter/receiver 72-1. The switch 742 may be adapted to be responsive to the control unit 71 to switch itself, for example, to one of its output ports that is connected to the transmitter/receiver 72-1.

In this way, upstream signals have the wavelength thereof converted into the wavelength $\lambda 1$ and is supplied to the transmitter/receiver 72-1.

In downstream transmission, signals from the transmitter/receiver 72-1 are switched by the switch 742, and converted into the wavelength on each of the branches by the wavelength converter 741 to be transmitted to the ONUs on that branch.

At this time, a wavelength to which the wavelength converter 741 converts the original wavelength and when it converts the wavelength and the switch 742 switches itself are controlled by the control unit 71. For example, the control unit 71 is adapted to control the timing of upstream and downstream communication on each branch. Therefore, the control unit 71 instructs the wavelength converter 741 and the switch 742 on wavelength conversion of the signals according to the timing of downstream communication on each branch.

Downstream communication may thus be performed in this way to thereby cause the single transmitter/receiver 72-1 to collectively deal with the ONUs 2 on the branches 2 through n without operating the remaining transmitter/receivers 72-2 and 72-n.

Next, it will be described with reference to FIG. 14 how to transmit downstream transmission frames under the situation of collectively handling the ONUs described above. FIG. 14 shows downstream transmission frames in the situation of the collective handling.

In the control unit 71, the MPCP processing unit 111 is structured to process MPCP control over each branch. The MPCP control on each branch may be proceeded to according to the control flow shown in FIG. 7.

More specifically, after the OLT 7 is powered on (S101), the MPCP processing unit 111 performs for each branch a discovery process on the ONUs 2 contained in that branch (S102). Then, the RTT value of each ONU 2 is measured in the discovery process, and the order determiner 65 determines the Order value of each ONU 2 (S103). The wait time calculator 66 in turn may calculate the wait times of the ONUs 2 (S104) similarly to the earlier described embodiment shown in FIG. 5 but for each branch.

The wait time notifier 67 transmits, for each branch, a Gate frame including the wait time of each ONU 2.

Successively, communication starts between the OLT 7 and the ONUs 2 on each branch (S106), and the band allocation processor 712 allocates a band to each ONU 2 by using the DWBA.

Figure 14:
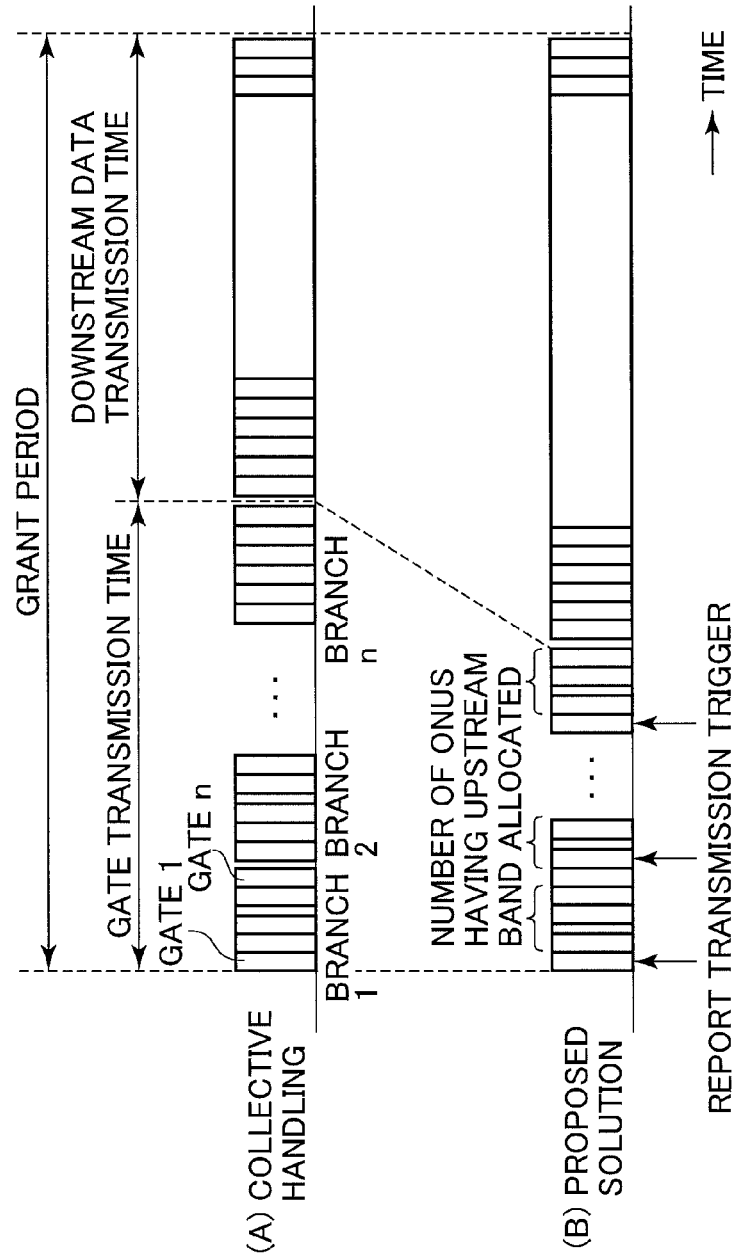
FIG. 14 is a time chart useful for understanding how to transmit downstream transmission frames in the situation of collectively dealing with ONUs in accordance with the prior art and the present invention.

In FIG. 14, line (A), shows transmission of Gate frames that would be attained by collectively dealing with ONUs in a conventional WDM/TDM-PON system. In the prior art as shown in line (A), Gate frames to the ONUs 2 would be transmitted for each branch in the grant period. Therefore, transmission is made in such a fashion that, for example, Gate frames are transmitted to the ONUs 2 in sequence on the branch 6-1 to complete the transmission to all ONUs 2 thereon, and then Gate frames are transmitted to the ONUs 2 in sequence on the branch 6-2, and so on. Thus in the prior art, the downstream data transmission time would be squeezed to thereby deteriorate the transmission efficiency of downstream data.

By contrast in accordance with the instant alternative embodiment, as seen from FIG. 14, line (B), the OLT 7 broadcasts a frame for Report transmission trigger for each branch. In other words, the frame for Report transmission trigger is transmitted once on each branch.

After the OLT 7 transmits the frame for Report transmission trigger on a branch, it transmits Gate frames to the ONUs 2 currently communicating on that branch. This may be similar to the illustrative embodiment shown in FIG. 5.

In this way, the OLT 7 transmits a Report transmission trigger for a branch once to each branch, and then transmits Gate frames only to the currently communicating ONUs 2. This can improve the efficiency of transmitting downstream data.

In summary, the optical access network using the WDM/TDM-PON according to the alternative embodiment may improve the efficiency of transmitting downstream data even when the OLT has lots of ONUs appearing thereon, similarly to the embodiment previously described.

The alternative embodiments described so far are directed to the transmission control for use in a line terminating unit in an optical access system. The present invention may, however, not be restricted specifically to optical access systems, but may also be applied to transmission control of electric signals.

The entire disclosure of Japanese patent application No. 2011-222219 filed on Oct. 6, 2011, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A transmission control apparatus responsive to a control signal transmitted to and received from a plurality of communication devices connectable to said apparatus for allocating a time division communication band to control transmission of the plurality of communication devices, comprising:
    a discovery processor detecting the communication devices connected and determining round trip time of transmission to each of the detected communication devices;
    an order determiner using the round trip time of transmission to each of the communication devices for determining an order of each of the communication devices corresponding to a distance to the communication device to produce ordering information;
    a transmission wait time calculator using the round trip time of transmission to each of the communication devices and the ordering information for determining transmission wait time in which transmission of the control signal from each of the communication devices is to be delayed;
    a transmission wait time notifier notifying each of the communication devices of the transmission wait time for the communication device; and
    a measurement start signal transmitter transmitting at one time, when starting communication with each of the communication devices, a timer count start signal to the communication devices as a whole, the timer count start signal prompting the communication device to start counting the transmission wait time.

2. The apparatus in accordance with claim 1, further comprising:
    a band allocator allocating a communication band to each of the communication devices depending on a volume of data waiting for transmission included in the control signal from each of said communication devices; and
    a control signal transmitter/receiver transmitting, after transmitting the timer start signal, the control signal including the communication band allocated by said band allocator to each of the communication devices to the communication device currently communicating.

3. The apparatus in accordance with claim 1, wherein, when said discovery processor detects the round trip time of transmission to the communication device currently communicating being updated or a newly participating communication device,
    said order determiner determines again the order on a basis of the updated round trip time of transmission to the communication device or the round trip time of transmission to the newly participating communication device, said transmission wait time calculator determines again the transmission wait time for each of the communication devices on the basis of the updated round trip time of transmission to the communication device and the ordering information on the order determined again; and said transmission wait time notifier temporarily stops the communication, and then notifies each of the communication devices of the transmission wait time newly determined for the communication device.

4. The apparatus in accordance with claim 1, wherein said apparatus is included in a line terminating unit in an optical access system using a gigabit Ethernet passive optical network (GE-PON).

5. The apparatus in accordance with claim 1, wherein said apparatus is included in a line terminating unit in an optical access system using a GE-PON, and the communication devices are grouped into a plurality of groups, said apparatus comprising a corresponding plurality of transmitter/receivers to the plurality of groups, said plurality of transmitter/receivers transmitting and receiving signals to and from the communication devices in each of the groups; and a controller allowing one of said transmitter/receivers to collectively deal with transmission and reception of the signals to and from the communication devices in the plurality of groups.

6. The apparatus in accordance with claim 1, wherein the control signal is a Report frame signal, and the timer start signal is a Gate frame signal defined by Institute of Electrical and Electronics Engineers (IEEE) 802.3av/ah. Std.

7. A non-transitory computer-readable medium on which is stored a program for having a computer operate as a transmission control apparatus which is responsive to a control signal transmitted to and received from a plurality of communication devices connectable to the apparatus for allocating a time division communication band to control transmission of the plurality of communication devices, wherein said program, when installed and run in the computer, controls the computer to function as:

a discovery processor detecting the communication devices connected and determining round trip time of transmission to each of the detected communication devices;

an order determiner using the round trip time of transmission to each of the communication devices for determining an order of each of the communication devices corresponding to a distance to the communication device to produce ordering information;

a transmission wait time calculator using the round trip time of transmission to each of the communication devices and the ordering information for determining transmission wait time in which transmission of the control signal from each of the communication devices is to be delayed;

a transmission wait time notifier notifying each of the communication devices of the transmission wait time for the communication device; and a measurement start signal transmitter transmitting at one time, when starting communication with each of the communication devices as a whole, a timer count start signal to the communication device, the timer count start signal prompting the communication device to start counting the transmission wait time.

8. A line terminating unit comprising a transmission control apparatus which is responsive to a control signal transmitted to and received from a plurality of communication devices connectable to said apparatus for allocating a time division communication band to control transmission of the plurality of communication devices, said apparatus comprising:

a discovery processor detecting the communication devices connected and determining round trip time of transmission to each of the detected communication devices;

an order determiner using the round trip time of transmission to each of the communication devices for determining an order of each of the communication devices corresponding to a distance to the communication device to produce ordering information;

a transmission wait time calculator using the round trip time of transmission to each of the communication devices and the ordering information for determining transmission wait time in which transmission of the control signal from each of the communication devices is to be delayed;

a transmission wait time notifier notifying each of the communication devices of the transmission wait time for the communication device; and a measurement start signal transmitter transmitting at one time, when starting communication with each of the communication devices, a timer count start signal to the communication devices as a whole, the timer count start signal prompting the communication device to start counting the transmission wait time.

* * * * *